(12) United States Patent
Williams et al.

(10) Patent No.: US 10,382,509 B2
(45) Date of Patent: Aug. 13, 2019

(54) AUDIO-BASED APPLICATION ARCHITECTURE

(75) Inventors: Hunter Williams, Seattle, WA (US);
William D. Carr, Seattle, WA (US);
Kevin J. Gasper, Seattle, WA (US);
Cameron Janes, Seattle, WA (US);
Andrew J. Watts, Seattle, WA (US);
James H. Wood, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 953 days.

(21) Appl. No.: 13/016,009

(22) Filed: Jan. 28, 2011

(65) Prior Publication Data

US 2012/0198339 A1 Aug. 2, 2012

(51) Int. Cl.
*G06F 3/16* (2006.01)
*H04L 29/06* (2006.01)

(52) U.S. Cl.
CPC ............ *H04L 65/4092* (2013.01); *G06F 3/16* (2013.01)

(58) Field of Classification Search
CPC ............. G06F 3/167; H04N 21/44394; H04N 21/44008
USPC ......................................................... 715/727
See application file for complete search history.

(56) References Cited

U.S. PATENT DOCUMENTS

| | | | | |
|---|---|---|---|---|
| 6,507,727 B1* | 1/2003 | Henrick | ................. | G06Q 30/06 348/E7.071 |
| 2004/0044516 A1 | 3/2004 | Kennewick et al. | | |
| 2005/0239397 A1 | 10/2005 | Kreifeldt et al. | | |
| 2007/0124756 A1 | 5/2007 | Covell et al. | | |
| 2007/0139553 A1* | 6/2007 | Kister | ................... | G08B 25/14 348/468 |
| 2007/0189544 A1* | 8/2007 | Rosenberg | ........... | G11B 27/105 381/57 |
| 2007/0203735 A1* | 8/2007 | Ashton | .................. | G06Q 10/02 705/5 |
| 2008/0109095 A1* | 5/2008 | Braithwaite et al. | ........... | 700/94 |
| 2008/0282305 A1 | 11/2008 | Uhrig et al. | | |
| 2009/0094602 A1* | 4/2009 | Ziskind | .................. | G01C 21/30 717/178 |
| 2010/0226526 A1* | 9/2010 | Modro | ............... | G06K 9/00577 382/100 |
| 2010/0286985 A1 | 11/2010 | Kennewick et al. | | |

(Continued)

FOREIGN PATENT DOCUMENTS

| | | |
|---|---|---|
| CN | 1349213 | 5/2002 |
| CN | 1349213 A | 5/2002 |

(Continued)

OTHER PUBLICATIONS

Wang, Avery; The Shazam Music Recognition Service; Communications of the ACM; Vo. 49, No. 8; Aug. 2006; pp. 44-48.*

(Continued)

*Primary Examiner* — Jennifer N To
*Assistant Examiner* — Ashley M Fortino
(74) *Attorney, Agent, or Firm* — Lee & Hayes, P.C.

(57) ABSTRACT

An application architecture comprises one or more audio interfaces placed within the premises of users. A cloud-based application engine receives audio information from the interfaces and provides information to cloud-based applications based on the audio within the user premises. The other applications utilize the information to provide or enhance services to the users.

23 Claims, 4 Drawing Sheets

(56) References Cited

U.S. PATENT DOCUMENTS

| | | | | |
|---|---|---|---|---|
| 2010/0312547 | A1* | 12/2010 | Van Os | G06F 3/167 |
| | | | | 704/9 |
| 2010/0333137 | A1* | 12/2010 | Hamano | H04H 60/46 |
| | | | | 725/39 |
| 2011/0016397 | A1 | 1/2011 | Sapp et al. | |
| 2012/0303452 | A1* | 11/2012 | Xue et al. | 705/14.49 |

FOREIGN PATENT DOCUMENTS

| | | |
|---|---|---|
| CN | 201218985 | 4/2009 |
| CN | 201218985 Y | 4/2009 |
| JP | 2002058013 | 2/2002 |
| JP | 2003115929 | 4/2003 |
| JP | 2009518884 | 5/2009 |
| JP | 2010183159 | 8/2010 |
| WO | WO0075900 | 12/2000 |
| WO | WO2011088053 A3 | 7/2011 |

OTHER PUBLICATIONS

PCT Search Report dated Apr. 6, 2012 for PCT application No. PCT/US12/22703, 8 pages.

Hoashi, "Fifth Installment, Cutting Edge of Multimedia Search", The Journal of the Institute of Image Information and Television Engineers, The Institute of Image Information and Television Engineers, vol. 64, No. 5, pp. 701-707, May 1, 2010.

Imaoka, "Invitation from an Android Engineer", SoftwareDesign, Publication No. 240, pp. 158-163, Gijutsu-Hyohron Co., Ltd., Oct. 18, 2010.

Translated Japanese Office Action dated Jul. 15, 2014 for Japanese patent application No. 2013-551329, a counterpart foreign application of U.S. Appl. No. 13/016,009, 8 pages.

Translated Japanese Office Action dated Mar. 10, 2015 for Japanese patent application No. 2013-551329, a counterpart foreign application of U.S. Appl. No. 13/016,009, 10 pages.

Chinese Office Action dated Apr. 5, 2016 for Chinese patent application No. 201280006837.6, a counterpart foreign application of U.S. Appl. No. 13/016,009, 20 pages.

Translated Chinese Office Action dated Aug. 13, 2015 for Chinese Patent Application No. 201280006837.6, a counterpart foreign application of U.S. Appl. No. 13/016,009, 20 pages.

Extended European Search Report dated Mar. 11, 2016 for European patent application No. 12739108.4, 9 pages.

Translated Japanese Office Action dated Apr. 19, 2016 for Japanese Patent Application No. 2013-551329, a counterpart foreign application of U.S. Appl. No. 13/016,009, 20 pages.

Translated Japanese Office Action dated Sep. 29, 2015 for Japanese patent application No. 2013-551329, a counterpart foreign application of U.S. Appl. No. 13/016,009, 5 pages.

Chinese Office Action dated Nov. 22, 2016 for Chinese patent application No. 201280006837.6, a counterpart foreign application of U.S. Appl. No. 13/016,009.

Chinese Office Action dated Sep. 21, 2017 for Chinese Patent Application No. 201280006837.6, a counterpart foreign application of U.S. Appl. No. 13/016,009.

European Office Action dated Mar. 26, 2018 for European Patent Application No. 12739108.4, a counterpart foreign application of U.S. Appl. No. 13/016,009, 8 pages.

Chinese Office Action dated Feb. 12, 2018 for Chinese Patent Application No. 201280006837.6, a counterpart foreign application of U.S. Appl. No. 13/016,009.

* cited by examiner

AUDIO-BASED APPLICATION ARCHITECTURE

BACKGROUND

Homes and other user premises are increasingly equipped with always-on Internet or "cloud" connectivity. In many cases, even mobile users have constant or nearly constant data connectivity. The common availability of network communications has created a number of new possibilities for services and other functionality, using the variety of connected devices accessible to users.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Described herein are systems and techniques for utilizing audio information that may already exist within a home or other location. To collect the audio information, network-enabled microphones can be placed at different activity centers within a home or user premises. The microphones may be incorporated in small, self-contained units, with wireless networking capabilities, and configured to transmit audio-based information to a cloud-based application engine or service. The cloud-based application engine may monitor the audio-based information and process it to identify events, status, or other information about current activities within the home. The application engine may also identify commands that are spoken by users within the home.

In the described embodiment, the application engine exposes an application interface that other cloud-based entities can access. The application interface allows the other entities to receive data regarding in-home activities, status, commands, and so forth. Authorization and authentication safeguards are employed to ensure that only entities authorized by users are able to access this information.

Authorized cloud-based applications may utilize the services of the application engine to enhance their own services to users. For example, a cloud-based application might communicate with the application engine to receive notifications of commands spoken by users, and may act on those commands. As a more specific example, a user may speak a command such as "purchase movie tickets for Rambo tonight." The application engine, upon receiving this audio, might convert it to a textual stream and provide it to an application that purchases movie tickets for users using payment information that the user has previously provided and authorized for use in response to the engine receiving certain voice-based commands. The application, in response to receiving the textual command, may purchase the requested movie tickets and transmit them electronically to a device associated with the user, such as the user's computer or smartphone.

System Architecture Example

Figure 1:
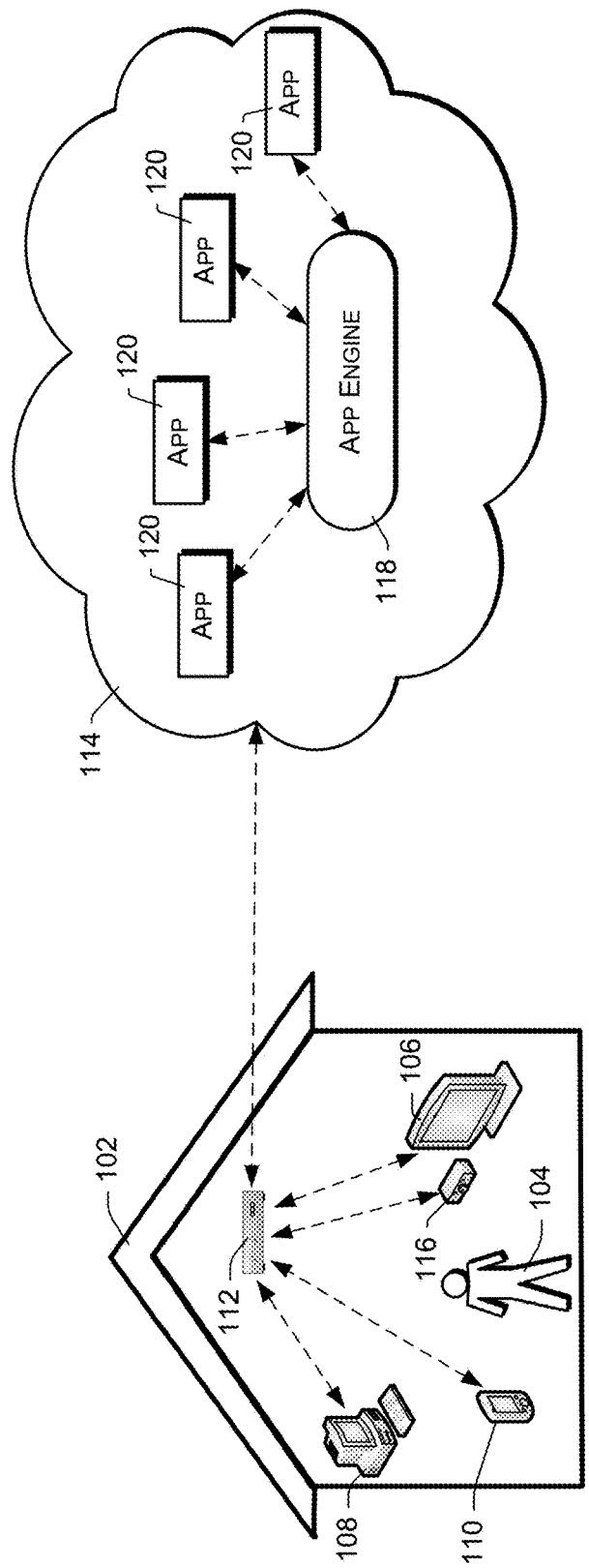
FIG. 1 is a block diagram illustrating an operational environment in which applications may utilize an application engine, and may respond to audio from user premises to provide various services to users.

FIG. 1 illustrates an environment 100 in which these techniques might be practiced. The environment includes a home or other user premises 102. User premises may include houses, offices, automobiles, and other spaces. Although a single home 102 is illustrated in FIG. 1, most implementations will include multiple premises and users.

Within the home 102 is a user 104 and several devices associated with the user 104. The illustrated devices include a media device 106, representing any one or more of various types of devices such as televisions, audio players, video players, and so forth. The illustrated devices also include a computer 108, which represents one or more of various types of devices such as laptop computers, desktop computers, tablet computers, netbooks, other network-enabled devices, and so forth. A personal computing device 110 may also be associated with the user, such as a smartphone, pager, PDA (personal digital assistant), book reader device, or other type of portable device, including various types of electronic communications devices.

Note that the devices shown within the home 102 are merely examples of a wide variety of devices that may be present within a user premises or associated with a user. Many such devices may have some sort of network connectivity. In this case, the in-home devices connect to a router or access point 112, which is in turn connected to a public network 114. Connection between in-home devices and the router 112 may be through wired or wireless technologies.

Although the devices within the home 102 are illustrated as connecting to the network 114 via the in-home router 112, network connectivity might be implemented in various other ways. For example, some in-home devices may communicate with the network 114 using cellular data technologies, or through other types of wired and wireless technologies that do not involve an in-home router or access point. Thus, the particular configuration shown in FIG. 1 is presented merely as an illustration of one possible way in which network connectivity may be achieved.

The network 114 represents what has come to be known as the "cloud," which may include a vast array of network-based entities, servers, clients, applications, and services. Blocks within the network 114 represent cloud-based applications and/or services that are relevant to this discussion.

The network 114 may be a conglomeration of various discrete networks and systems, interconnected in various ways so that for functional purposes they appear more or less as a unified network. The network 114 may thus include various types of communication networks, including local-area networks, wide-area networks, the Internet, wireless networks, cable television networks, telephone networks, cellular communications networks, etc. The techniques discussed herein may also be practiced in smaller networks, including localized and/or private networks.

The user's home 102 may be equipped with one or more on-premises audio monitoring devices 116, referred to herein as in-home audio interface devices. An audio interface device 116 may in some embodiments comprise a device having a microphone and a network interface. In certain embodiments, the interface device may also have a speaker or other form of audio output.

The interface device 116 may be relatively small, so that several such devices can be unobtrusively placed at various locations within the home 102. As an example, interface devices can be implemented in a small, cylindrical enclosures, resembling hockey pucks.

Each interface device 116 may have a power connection to receive operating power. In the described embodiment, other connections are not needed. In some embodiments, however, audio may be provided to one or more audio interface devices 116 from an external source; connectors, receptacles, or ports may be available on the interface devices 116 for this purpose.

The audio interface devices 116 can be placed within the home 102 so that their microphones detect ambient sound or noise within the home 102. It may be convenient in many situations to place the audio interface devices near media devices within the home 102, such as the media device 106, so that audio produced by such media devices will be detected and clearly received by the audio interface devices 116. It may also be convenient to place the interface devices near activity centers, such as in the kitchen, on desks, and so forth, so that user speech can be clearly received.

In the embodiment shown in FIG. 1, the interface devices 116 communicate with and transmit environmental information to a cloud-based application service or engine 118, via the router 112 and the network 114. As mentioned above, such cloud-based communication might be implemented in many ways, and is not limited to the particular router-based configuration shown in FIG. 1. As an example, the interface devices might use cellular or other wireless data communications technologies to communicate with the application engine 118.

FIG. 1 also illustrates a plurality of cloud-based applications or services 120 that interact with the application engine 118 and that base their services at least in part on information obtained or derived from the in-home audio interface devices 116. The applications 120 may be web-based applications that are accessible to users via a network browser, operating in conjunction with the computer 108 or another Internet terminal or access device. Various mobile devices and communications devices can also be used to access such applications. Some of the applications 120 may serve as resources for programs that execute on local devices such as the computer 108 or the personal device 110. Such local programs may operate in conjunction with the cloud-based applications 120 to provide various different services and functionality, ranging from email services to games. Cloud-based or network-based applications such as the applications 120 may communicate and operate in conjunction with a wide variety of network-connected devices, including entertainment devices, game boxes, media devices, home automation and security devices, communications devices, and so forth.

In operation, the application engine 118 receives audio-based information from the interface devices 116. The audio information may include audio streams, user commands or notifications derived from vocal utterances, environmental information derived from on-premises audio, and so forth. The application engine 118 processes the audio-based information to determine various data about user activities, status, environment, commands, etc. This data can then be obtained by authorized applications 120, which can act on the information to provide or enhance services to the user 104.

Figure 2:
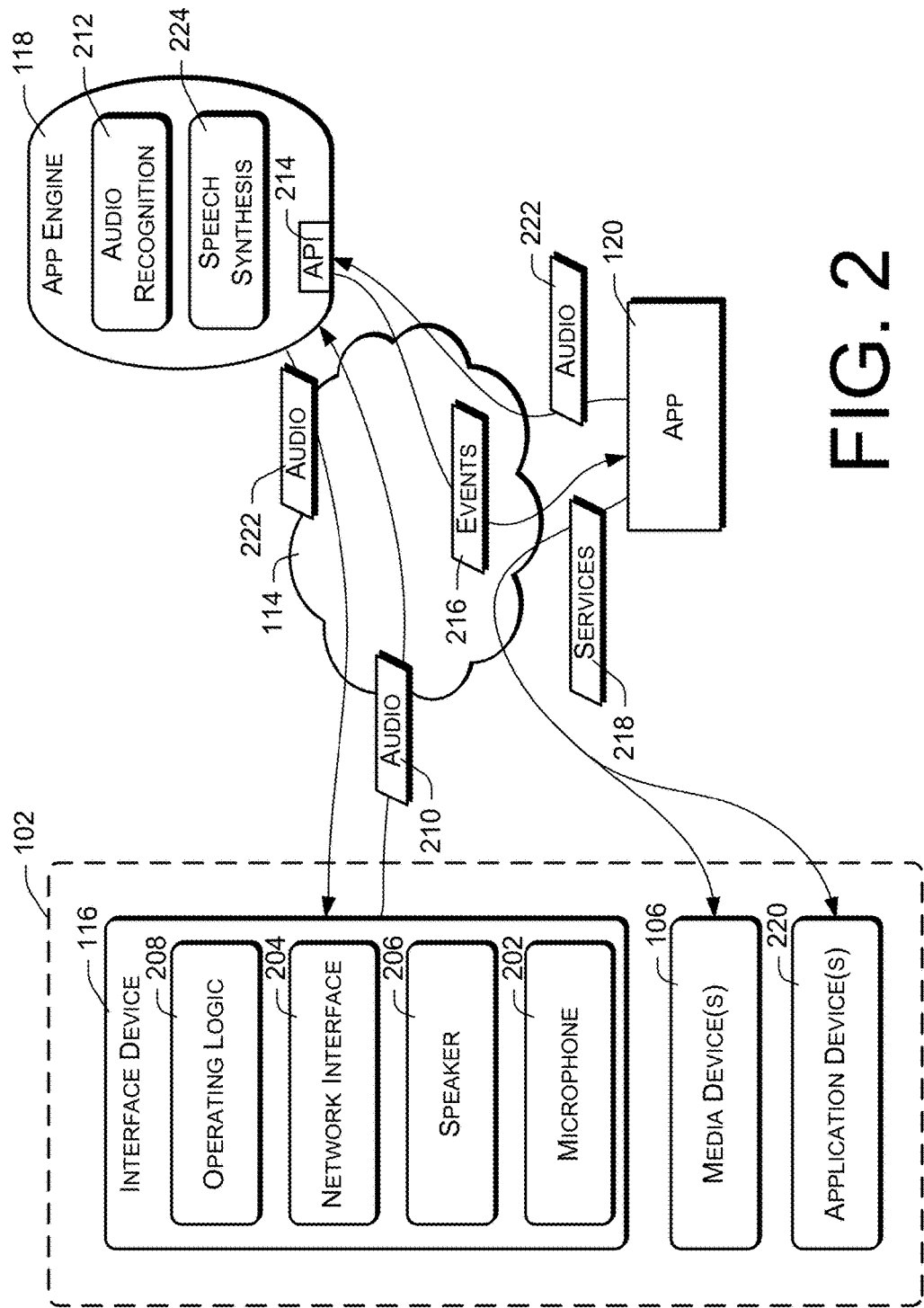
FIG. 2 is a block diagram illustrating additional details regarding the system of FIG. 1.

FIG. 2 illustrates additional details regarding interactions between the described devices and services. As mentioned above, one or more in-home audio interface devices 116 may be located within the home 102. An individual interface device 116 may include a microphone 202 that is configured to detect ambient noise, sounds, and speech. The interface device 102 may also include a network interface 204 that facilitates network communications with various entities, including the application engine 118 and one or more applications 120, via the network 114. The interface device may also include a speaker 206, and operating logic 208. The operating logic 208 may be implemented as one or more programmable processing units, associated memory, and appropriate instructions stored in the memory and executed by the processing unit. Other types of logic may also be used to configure the interface device 116 to perform the functions described here.

In one embodiment, the interface device 116 is configured to send audio-based information 210 to the application engine 118, based on ambient audio detected by the microphone 202 of the interface device 116. The audio-based information 210 may comprise a continuous audio stream, or may comprise separate audio streams corresponding to different periods of activity or noise within the home 102 and nearby the interface device 116. For example, an audio stream may be transmitted whenever ambient noise levels exceed a minimum threshold.

In other embodiments, the interface device 116 may pre-process the audio from the microphone 202, and may transmit higher level audio-based information to the application engine 118. For example, the operating logic 208 of the interface device 116 might perform speech recognition on the ambient audio, and transmit interpreted commands or text streams to the application engine 118. As another example, the operating logic 208 might be configured to recognize and identify music that is being played by one of the media devices 106, and to transmit data to the application engine 118 indicating or identifying the music currently being played. In some embodiments, the interface device 116 may utilize online or cloud-based services, such as music databases, to perform its functions.

Note that individual interface devices 116 can be associated with respective premises through some type of initialization or registration procedure, and communications with interface devices can be authenticated using cryptographic techniques.

The application engine 118 is configured to receive the audio-based information 210. Depending on the type or format of the received information, the application engine 118 processes it to identify and create event, status, and/or command data relating to in-home activities. In some embodiments, the application engine 118 may keep a record of data objects or event descriptors, each representing and identifying a discrete event or item of information. As examples, event descriptor objects may be created to identify or indicate the following types of information:

spoken commands uttered by users;
songs that are being played within the home;
television shows that are being viewed within the home;
movies or other media items that are being presented or rendered;
the percentage of completion of currently rendered media items.

Information such as this can be identified by means of sound, voice, and/or music recognition technologies. For example, voice recognition technologies can be used to convert user speech into text, which can in turn be parsed to identify particular commands or instructions. Music recognition technologies can compare songs to known databases to identify the songs, and possibly the performers and other data regarding the songs. Similar technologies can be used to compare audio against databases of other know media such as television shows, podcasts, movies, and so forth. In addition to identifying particular media items being played, the application engine may identify or monitor the particular point within a media item that is currently being played.

As mentioned above, the audio may be processed within the interface device 116, and the application engine may receive high-level notifications of events, media, etc. However, the audio-based information 210 received by the application engine 118 may comprise a raw audio stream, which may be processed by the application engine 118 to derive event descriptors. Thus, the application engine may include audio recognition logic 212, such as speech-to-text conversion logic and other sound recognition functionality to recognize various types of sounds and media.

In the described embodiment, the application engine 118 exposes an application interface 214 (also referred to as an application programming interface or API) to the cloud-based applications 120. The API 214 allows an application 120 to obtain event descriptors that have been created by the application engine 118. With appropriate authentication, the application 120 may query the application engine 118 through the API 214 to obtain and receive event descriptors or notifications 216 regarding events and conditions within the home 102. Authorization for an application 120 to receive information regarding a particular home or installation will typically be granted by a user associated with the home—only those applications authorized by the user are allowed to access the in-home information.

The application 120 may use the information from the event notifications 216 to initiate or customize services 218 on behalf of users associated with the home 102. Such services may be provided through any of the media devices 106 located in the home, as well as through other application devices 220, including computers 108, personal devices 110, and other devices available to users. As mentioned above, the services 218 may be provided as web-based services that are accessible through web or Internet browsers, in conjunction with any suitable hardware. Services may also be provided in conjunction with other types of systems, including telephone systems, media players, automation systems and devices, and so forth. Examples of applications 120 and associated services 218 will be described below.

The API 214 of the application engine 118 may also allow the application 120 to provide audio 222 for eventual transmission to the interface device 116, to be played on the speaker 206. The audio may be in the form of text, in which speech synthesis or text-to-speech conversion may be performed by the application engine 118 or by the operating logic 108 of the interface device 116. In FIG. 2, the application engine 118 is illustrated as having a speech synthesis module 224. Alternatively, the audio 222 may be provided from the application 120 as a digital audio stream.

The various network communications between the components of FIG. 2 may be performed using existing networking protocols and techniques. Event descriptors 216 can be implemented in various ways, such as by the use of existing database technologies, and may be communicated using database query protocols or other protocols. Furthermore, some implementations may use various push technologies to actively transmit descriptors 216 to the applications 120 as they are identified. Audio and audio-based information may be formatted as files, audio streams, data objects, notifications, text streams, and so forth.

Figure 3:
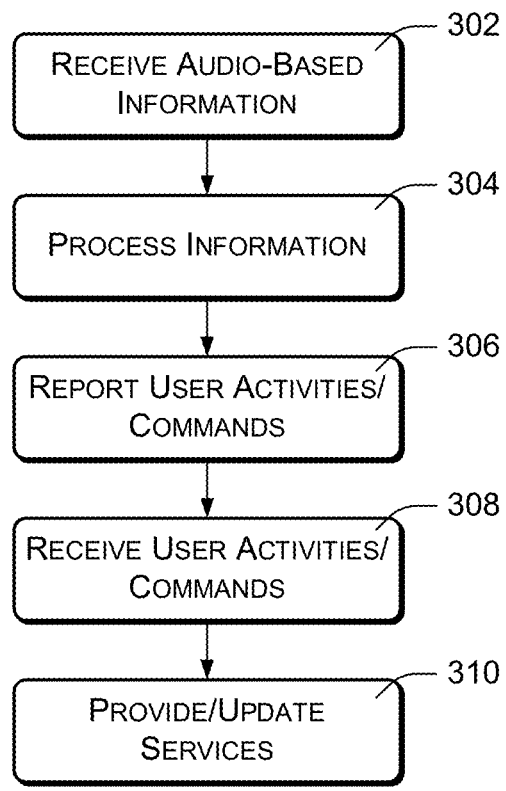
FIG. 3 is a flow diagram illustrating an example process that may be implemented within the environment of FIGS. 1 and 2.

FIG. 3 shows actions that may be performed in accordance with the embodiments described herein. An action 302 comprises receiving audio-based information from premises associated with one or more users, such as a home, office, automobile, etc. The audio-based information may comprise an audio stream or data derived from an audio stream. Audio may be received by an in-home or on-premises interface, by a cloud-based service or application engine, by other cloud-based services and applications, or combinations of these entities.

At 304, the audio-based information is processed to create data structures identifying current user-specific activities, events, status, environment, commands, and media within the user premises. Data structures may comprise database records or other data objects. Processing 304 may include speech recognition, speech-to-text conversion, music recognition, and other types of audio recognition, and may result in text-based or code-based notifications or commands.

At 306, the identified events, commands, and so forth are reported to applications that have been authorized by the user. The events and commands may be reported using database communication protocols or other protocols, using either push or pull models.

At 308, applications receive reported event and command notifications. At 310, the applications provide and/or enhance their services based on the notifications. For example, applications may act in response to received commands, or may provide certain information to a user that relates to the detected environment within the user premises.

Example Services

The architecture above can be utilized to provide a wide variety of services and functionality, of which the following are simple examples.

A cloud-based application may be configured to received vocal commands from users and to perform operations based on those commands. For example, a user may speak a grocery order, and the spoken order may be interpreted using the voice recognition functionality described above. Once interpreted, the order may be submitted to a grocery store for subsequent delivery or simply recorded as a shopping list that the user can view on their smartphone when shopping at the grocery store. An application such as this may apply personalized settings for each order, such as preferred delivery schedules and historical portion sizes.

Similarly, a cloud-based application may allow users to order tickets without needing a computer. A user may tell the application what movie they want to see. The application may use pre-configured information about the user (such as location) to determine which theater is near the user. The application may respond to a spoken command to order movie tickets by using the speech synthesis functionality of the system to query the user regarding movie selections and times.

An application may monitor ambient noise from the user's environment to determine what media (music, movie, television, etc.) is currently being rendered. Once the media is identified, the application may trigger an extension application on the user's smartphone or computer, which may provide instant access to rich metadata, recommendations, links, user communities, special interest groups, discussion boards, and so forth.

A similar type of application may identify the song the user is currently listening to, and in response may provide information about related articles, offer samples, suggest related music and playlists, or present information allowing the user to purchase individual music tracks.

An application may provide general information in response to users' uttered questions. A user may ask a question, such as "What's the recipe for deviled eggs?" The application may respond by emailing or otherwise providing a recipe for deviled eggs. In some cases, the application may use the speech synthesis functionality of the system to provide audio answers to spoken questions.

Similarly, the user may ask for directions to a certain location. The application may send a map, textual directions, and computerized routes to the user via the user's personal communications device, or may send information to the user's navigation device regarding the desired location.

As another example, such an application may allow the user to inquire about a flight or other event. The system might respond by sending information to the user via a device associated with the user, or by audibly responding using speech synthesis.

An application might also be designed to allow a user to control various on-premises devices and equipment, such as media equipment and home-automation devices. For example, such an application may accept spoken commands from a user regarding on-premises devices, and may respond by interacting with such devices through available network connections.

Server Example

Figure 4:
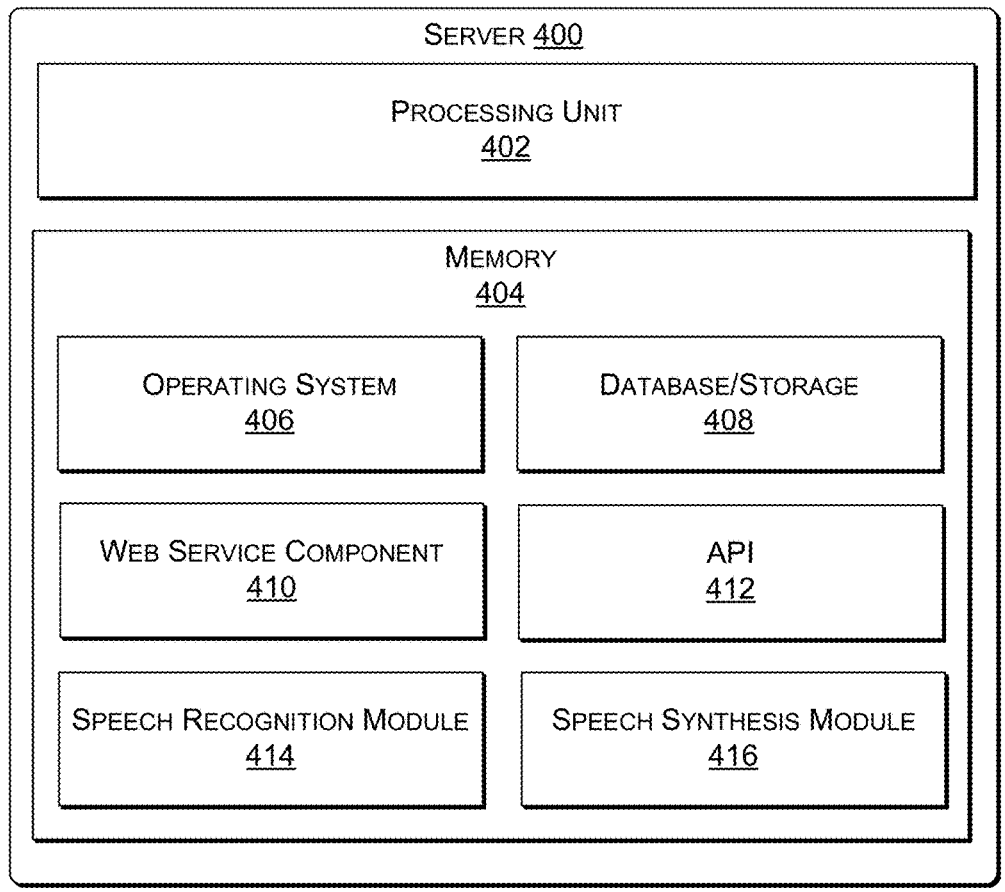
FIG. 4 is a block diagram illustrating components of a server that may be used to implement many of the techniques described herein.

FIG. 4 illustrates relevant components of a server 400 that may be used to implement the functionality of the application engine 118 and/or any of the applications 120. Generally, any of these entities may be implemented by one or more servers, with the various functionality described above distributed in various ways across the different servers. Servers may be located together or separately, and organized as virtual servers, server banks, and/or server farms. The described functionality may be provided by the servers of a single entity or enterprise, or may utilize the servers and/or services of multiple entities or enterprises.

In a very basic configuration, an example server 400 may comprise a processing unit 402 composed of one or more processors, and memory 404. Depending on the configuration of the server 400, the memory 404 may be a type of computer storage media and may include volatile and non-volatile memory. Thus, the memory 404 may include, but is not limited to, RAM, ROM, EEPROM, flash memory, or other memory technology.

The memory 404 may be used to store any number of functional components that are executable by the processing unit 402. In many embodiments, these functional components comprise instructions or programs that are executable by the processing unit 402, and that when executed implement operational logic for performing the actions attributed above to the content service 108 and the ingestion service 110. In addition, the memory 404 may store various types of data that are referenced by executable programs, including content items that are supplied to consuming devices such as electronic reader 104.

Functional components stored in the memory 404 may include an operating system 406 and a database 408 to store various items related to functionality provided by the server 400. Functional components of the server 400 may also comprise a web service component 410 that interacts with remote devices such as computers, media consumption devices, and so forth.

The memory 404 may also have instructions implementing one or more APIs 412, which may comprise the API 214 described with reference to FIG. 2, configured to interface with applications 120 as described. The memory may also include a speech recognition module 414 and a speech synthesis module 416, providing functionality as also described above.

The server 400 may of course include many other logical, programmatic, and physical components that are not shown in FIG. 4.

Conclusion

The various techniques described above are assumed in the given examples to be implemented in the general context of computer-executable instructions or software, such as program modules, executed by one or more computers or other devices. Generally, program modules include routines, programs, objects, components, data structures, etc. for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

The invention claimed is:

1. A system comprising:
one or more processors;
one or more network interfaces; and
memory storing computer-executable instructions that, when executed on the one or more processors, cause the one or more processors to performs acts comprising:
receiving, by a first application hosted by a remote computing device, an indication that a second application is authorized to receive data from the first application;
receiving, by the first application hosted by the remote computing device, and based at least in part on ambient noise levels exceeding a predetermined threshold, audio data corresponding to at least one of a song, a television show, or a movie, the audio data received from at least one on premises audio monitoring device via the one or more network interfaces;
analyzing, by the first application hosted by the remote computing device, the audio data to identify at least one of the song, the television show, or the movie;

providing, via the one or more network interfaces and based at least in part on receiving the indication, first data to the second application, the first data identifying at least one of the song, the television show, or the movie;

receiving, by the first application hosted by the remote computing device via the one or more network interfaces, second data from the second application, the second data corresponding to, but different than, at least one of the song, the television show, or the movie; and sending, by the first application hosted by the remote computing device via the one or more network interfaces to a second on premises device associated with an on-premises user, the second data, the second on premises device different than the on premises audio monitoring device.

2. The system of claim 1, wherein the second data corresponds to at least one of the song, the television show, or the movie sent to the device corresponds to audio.

3. The system of claim 1, wherein the first data also corresponds to the on-premises user, and wherein the one or more processors further perform acts comprising:

selecting, based at least in part on the on-premises user, the second data corresponding to at least one of the song, the television show, or the movie.

4. The system of claim 1, wherein:

providing the first data includes providing the first data to the first application and the second application; and receiving the second data includes receiving the second data from at least the first application or the second application.

5. A method comprising:

under control of one or more remote computing devices configured with executable instructions, receiving, by a first application hosted by one or more remote computing devices, an indication that a second application is authorized to receive input data from the first application;

receiving, by the first application and based at least in part on ambient noise levels exceeding a predetermined threshold, audio data from at least one audio monitoring device located at a first premises;

processing, by the one or more remote computing devices, the audio data to identify a media item presented at the first premises;

reporting, via one or more network interfaces of the one or more remote computing devices and based at least in part on receiving the indication, first data associated with the media item to multiple network-based applications, the multiple network-based applications providing services corresponding to the media item and including the second application, the first data including an identifier of the media item;

receiving, by the first application hosted by the one or more remote computing devices, second data from the second application, the second data corresponding to, but different than, the first data and the audio data; and sending, by the first application hosted by the one or more remote computing devices, the second data to an additional device, the second device located at the first premises.

6. The method of claim 5, wherein the audio data comprises a plurality of audio streams at the first premises, the method further comprising:

processing the audio streams to identify the first data associated with the media item.

7. The method of claim 5, further comprising processing the audio data to identify current user media consumption.

8. The method of claim 5, further comprising performing voice recognition on the audio data to identify at least one user command.

9. The method of claim 5, further comprising sending, by the first application hosted by the one or more remote computing devices, an audio response to the at least one audio monitoring device located at the first premises.

10. The method of claim 5, wherein the response is provided at the second premises to a personal device associated with the user.

11. The method of claim 5, wherein the media item presented at the first premises is one of a song, a television show, or a movie.

12. The method of claim 5, further comprising prior to reporting data to multiple network-based applications, determining that the user has authorized the multiple network-based applications to receive the data.

13. A network-based system, comprising:

one or more processors; and memory containing instructions that are executable by the one or more processors to perform acts comprising:

receiving, from a first application, an indication that a second application is authorized to receive data from the first application;

receiving, based at least in part on ambient noise levels exceeding a predetermined threshold, audio data from a first remote network-based service associated with a user, the audio data captured by an audio monitoring device within a first premises;

processing, by one or more remote computing devices, the audio data to identify a current activity associated with the user;

reporting, based at least in part on receiving the indication, first data associated with the media item to the second application, the second application providing services corresponding to the media item, the first data including an identifier of the media item;

receiving, second data from the second application, the second data corresponding to, but different than the audio data; and sending, based at least in part on data regarding the current activity, the second data to a second device associated with the user, the second device different than the audio monitoring device.

14. The network-based system of claim 13, wherein the data regarding the current activity associated with the user indicates current media consumption associated within the first premises.

15. The network-based system of claim 13, wherein:

the data regarding the current activity associated with the user indicates current media consumption of the user.

16. The network-based system of claim 13, wherein:

the data regarding the current activity associated with the user indicates at least one spoken command within the first premises; and providing to additional remote network-based services the data regarding the current activity associated with the user to is further based at least in part on the at least one spoken command.

17. The network-based system of claim 13, wherein the current activity associated with the user is at least one of watching a movie, watching a television show, or listening to a song.

18. The network-based system of claim 13, wherein the one or more processors further perform acts comprising:

determining, based at least in part on identifying the current activity, one or more stored user preferences corresponding to the current activity; and wherein providing the network-based services is further based at least in part on the one or more stored user preferences corresponding to the current activity.

19. A device, comprising:

a microphone configured to capture audio data from a premises associated with a user; and a network interface configured to:

send an authorization to allow a first application service to communicate with a second application service, the first application service residing on first computing resources remote from the premises and the second application service residing on second computing resources remote from the premises;

determine that an ambient noise level exceeds a threshold;

transmit, based at least in part on determining the ambient noise level exceeds the threshold, the audio data to the first application service;

receive first data from the first application service, the second data related to, but different from, the audio data and generated by the second application service; and cause one or more application interfaces of a device associated with the user and within the premises to display the second data to the user;

wherein the second data is audio data including unprocessed audio data.

20. The device of claim 19, further comprising:

a speech recognizer, wherein the second data comprises notifications derived at least in part from user utterances using the speech recognizer.

21. The device of claim 19, further comprising:

a speech recognizer, wherein the second data comprises media identifications.

22. The device of claim 19, wherein the first data is associated with a request to purchase goods and a preferred delivery schedule.

23. The device of claim 19, wherein the first data is textual directions.

* * * * *

UNITED STATES PATENT AND TRADEMARK OFFICE
CERTIFICATE OF CORRECTION

PATENT NO. : 10,382,509 B2
APPLICATION NO. : 13/016009
DATED : August 13, 2019
INVENTOR(S) : Hunter Williams et al.

Page 1 of 1

It is certified that error appears in the above-identified patent and that said Letters Patent is hereby corrected as shown below:

In the Claims

Claim 13, Column 10, Line 36, please replace "the media item" with "a media item"

Claim 19, Column 12, Line 1, after "service," please replace "the second" with "second"

Signed and Sealed this
Fourth Day of February, 2020

Andrei Iancu
*Director of the United States Patent and Trademark Office*